C. J. ULRICH.
GRAIN CLEANER.
APPLICATION FILED MAR. 4, 1918.
1,291,278.
Patented Jan. 14, 1919.
2 SHEETS—SHEET 1.
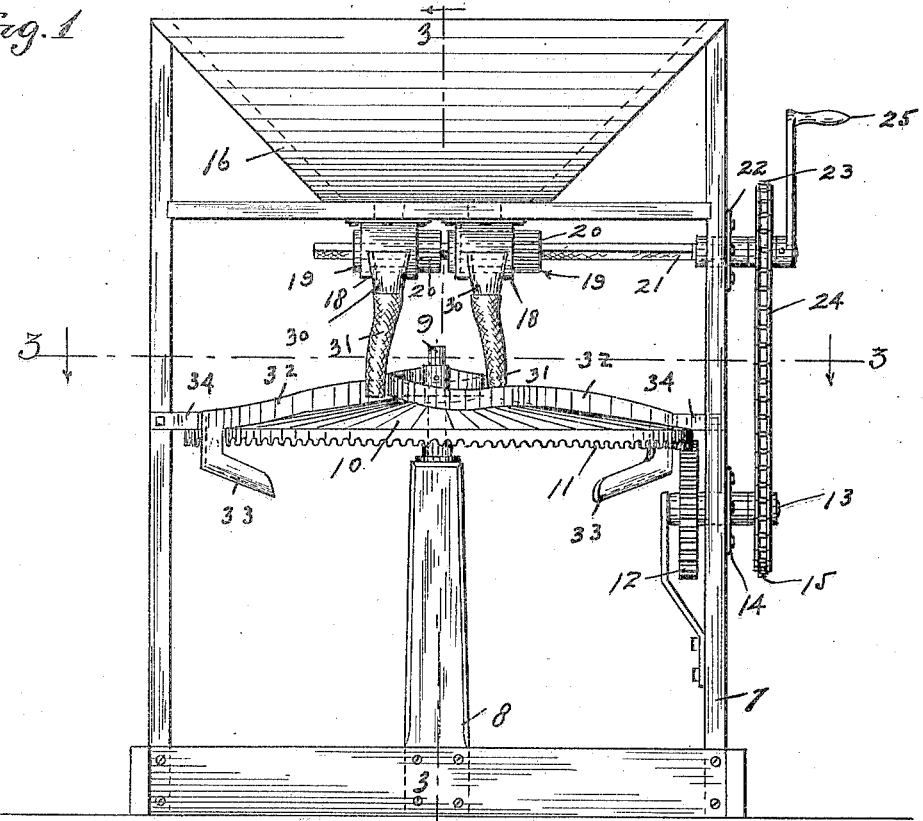
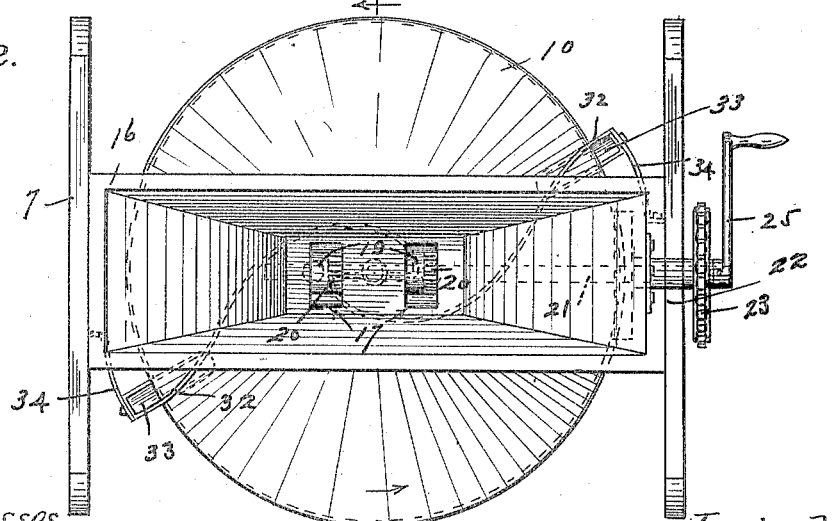
Witnesses
E. C. Wells
H. L. Ripley
Inventor
CARL J. ULRICH
By his Attorneys
Williamson Merchant C. J. ULRICH.
GRAIN CLEANER.
APPLICATION FILED MAR. 4, 1918.
1,291,278.
Patented Jan. 14, 1919.
2 SHEETS—SHEET 2.
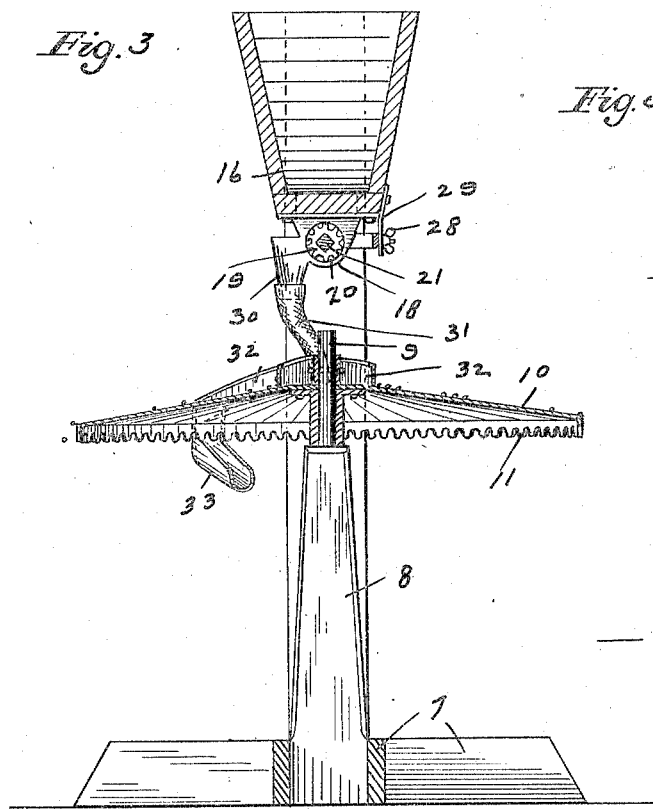
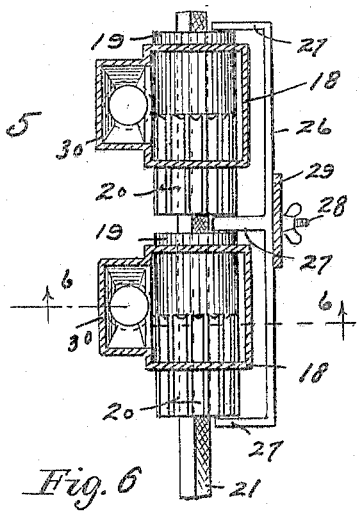
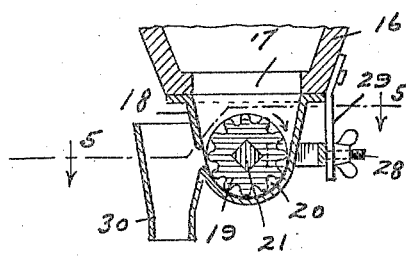
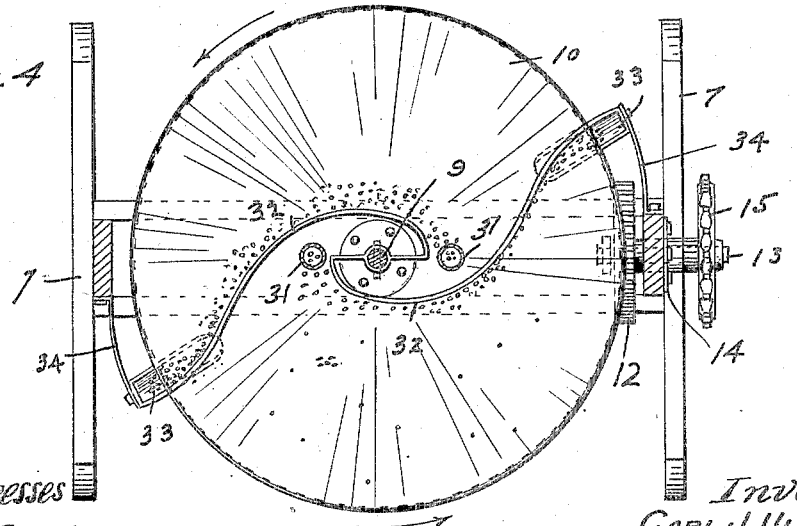
Witnesses
E. C. Wells
H. L. Ripley
Inventor
Carl J. Ulrich
By his Attorneys

UNITED STATES PATENT OFFICE.

CARL J. ULRICH, OF LAKE CRYSTAL, MINNESOTA.

GRAIN-CLEANER.

1,291,278.  Specification of Letters Patent.  Patented Jan. 14, 1919.

Application filed March 4, 1918. Serial No. 220,174.

*To all whom it may concern:*

Be it known that I, CARL J. ULRICH, a citizen of the United States, residing at Lake Crystal, in the county of Blue Earth and State of Minnesota, have invented certain new and useful Improvements in Grain-Cleaners; and I do hereby declare the following to be a full, clear, and exact description of the invention, such as will enable others skilled in the art to which it appertains to make and use the same.

My invention has for its object to provide an extremely simple and highly efficient grain cleaner, especially adapted for use, in removing the seeds of the so-called wild pea or vetch from wheat and other grain. These seeds, as is well known, are substantially the same size as wheat and, therefore, cannot be removed or separated from the wheat by the use of screens.

The essential feature of the invention is that the grain to be cleaned is fed upon the upper edge of a movable inclined plane which moves in a direction at right angles to the plane of the slope, the slope being of such degree that the wheat or other grain having irregular surfaces will remain on the plane, while the spherical vetch or other seeds roll off the lower edge thereof. The movable inclined plane is in the form of a broad conical disk which revolves in a horizontal plane about its axis. The grain is fed upon the separating surface of the disk in one or more streams by a mechanical feeding device of any desired construction, for instance, such as used in connection with grain drills or seeders. For each stream of grain fed upon the separating surface of the disk there is a fixed scraper blade, having its lower edge so arranged, with respect to said separating surface, that no seeds can pass thereunder. The purpose of these scraper blades is to agitate or disturb the relative position of the grain on the disk and to remove the cleaned grain from the disk at the lower edge thereof.

To the above end, the invention consists of the novel devices and combinations of devices hereinafter described and defined in the claims.

In the accompanying drawings, which illustrate the invention, like characters indicate like parts throughout the several views.

Referring to the drawings:

Figure 1 is a front elevation of the improved grain cleaner;

Fig. 2 is a plan view of the same;

Fig. 3 is a vertical section taken on the line 3—3 of Fig. 1;

Fig. 4 is a horizontal section taken on the line 4—4 of Fig. 1;

Fig. 5 is a horizontal section, taken on the irregular line 5—5 of Fig. 6; and

Fig. 6 is a vertical section, taken on the line 6—6 of Fig. 5.

The numeral 7 indicates a skeleton frame having rigidly secured to its base, a pedestal 8, on the upper end of which is a fixed trunnion 9. A disk 10, having a conical separating surface, the radial lines of which are relatively flat, is journaled, at its axis, on the trunnion 9 for rotation in a horizontal plane. On the periphery of the disk 10 are depending teeth which afford a large gear 11 that meshes with a pinion 12. This pinion 12 is secured to the inner end of a short shaft 13, intermediately journaled in a bearing 14, secured to the right hand upright of the frame 7. The shaft 13 is driven by a sprocket wheel 15, on the outer end thereof, in a manner that will presently appear.

Secured to the frame 7, above the disk 10, is a hopper 16, having in its bottom two ports 17, which open into cups 18, attached to the under side of the bottom of said hopper. Feed rollers 19, mounted in the cups 18, are of such length as to extend beyond the sides thereof, and have, on one of their end portions, circumferentially spaced feed grooves 20. These feed rollers 19 are mounted on the inner end of a square horizontal shaft 21, for rotation therewith, but with freedom for axial sliding adjustment thereon. The outer end portion of the shaft 21 is journaled in a bearing 22, secured to the right hand upright of the frame 7, directly above the bearing 14. On the outer projecting end of the shaft 21, is a sprocket wheel 23, that is alined with the sprocket wheel 15 and over which two sprocket wheels runs a sprocket chain 24. Secured to the shaft 21, outward of the sprocket wheel 22, is a hand crank 25, by which the disk 10 may be rotated at the desired speed.

The feed rollers 19 are moved axially on the shaft 21, to carry more or less of their grooves 20 into the cups 18 and thereby vary the feed, by a shipper bar 26, having laterally projecting fingers 27, which engage the ends of said rollers. This shipper bar 26 is secured in different adjustments to a horizontally slotted plate 28 on the hopper 16, by a thumb nut-equipped stud 29, which projects through said slot. The mechanical feed mechanism just described is of well known construction and commonly used in grain drills and seeders. Leading from the feed cups 18 are delivery tubes 30, having flexible lower end extensions 31, which terminate just above the separating surface of the disk 10 at diametrically opposite points from the trunnion 9 and quite close thereto.

For each stream of grain fed upon the disk 10 there is a scraper blade 32, and in the machine illustrated there are two. These two scraper blades 32 are substantially the same width throughout their entire length, and are set vertically edgewise over the disk 10, with their inner ends anchored to the upwardly projecting end of the trunnion 9. From the trunnion 9 the two scraper blades 32 extend radially in opposite directions toward the tubes 31. At points close to tubes 31 these scraper blades 32 are abruptly bent in opposite directions and extend in compound curves to points beyond the outer edge of the disk 10, and in the direction of the rotation thereof. The lower edges of the scraper blades 32 closely follow the contour of the separating surface of the disk, so that no seeds can pass thereunder. The upper edges of the scraper blades 32 are bent in an opposite direction to the rotation of the disk, to afford flanges which assist in holding the grain.

To the outer ends of the scraper blades 32 are attached discharge spouts 33, arranged to receive the cleaned grain collected on the disk 10, and deliver the same radially inward at points below said disk. Bags or other receptacles, not shown, may be provided for receiving the grain from the spouts 33. Brace bars 34 connect the upper ends of the discharge spouts 33 to the uprights of the frame 7, and thereby hold the outer ends of the scraper blades 32 in position with respect to the disk.

Materials to be cleaned, for instance, a mixture of grain and peas, is placed in the hopper 16, and by turning the crank 25, is fed, under the action of the feed rollers 19, through the discharge tubes 30 and 31, onto the separating surface of the disk 10. The wheat, owing to its uneven surface, will remain on the disk, while the peas, being spherical, will roll off the lower edge thereof. When the mixture of wheat and peas is fed upon the disk 10, through the feed tubes 31, most of the peas roll off the disk at once, but some of them, whose path is obstructed by kernels of wheat lying below them, move along with the wheat as the disk revolves on its axis. But when this group of wheat and peas comes in contact with the scraper blade, there is a disturbance of their relative positions, and as soon as the path is free, the peas roll down the slope, while the grains of wheat follow the scraper blade until they get to the outside edge of the disk. The compound curve, or in other words, the constantly changing surface of the scraper blades 32, which advance in the direction of the rotation of the disk, constantly change the position of the kernels of wheat and peas and thereby give the peas as many opportunities as possible to get out from among the kernels of wheat.

The above described invention, while extremely simple, and of comparatively small cost to manufacture, has in actual usage, proven highly efficient for the purpose had in view, and is especially adapted for farm use in cleaning seed grain.

What I claim is:

1. A grain cleaner comprising a disk mounted for rotation in a substantially true horizontal plane and having a smooth imperforate conical separating surface, a scraper blade overlying said separating surface and extending from the axis to the outer edge thereof, and means for feeding materials to be separated onto said separating surface in the vicinity of the inner end of the scraper blade.

2. A grain cleaner comprising a revoluble disk having a smooth imperforate conical separating surface, a scraper blade overlying said separating surface, extending outward from the axis thereof and advancing in the direction of the rotation of the disk, and means for feeding materials to be separated onto said separating surface at a diametrically opposite point from the outer end of the scraper blade.

3. A grain cleaner comprising a revoluble disk having a smooth imperforate conical separating surface, a scraper blade overlying said separating surface, extending outward from the axis thereof, on a compound curve and advancing in the direction of the rotation of the disk, and means for feeding materials to be separated onto said separating surface at a diametrically opposite point from the outer end of the scraper blade.

4. A grain cleaner comprising a revoluble disk having a conical separating surface, a ribbon-like scraper blade extending from the axis of the disk to the outer edge thereof and advancing in the direction of the rotation of the disk, said scraper blade being bent horizontally to cause its lower edges to conform to the contour of the separating surface of the disk, and means for feeding materials to be separated onto said separating surface in the vicinity of the inner end of the scraper blade.

5. The combination with a frame having a fixed upright trunnion, of a disk mounted on the trunnion and having a conical separating surface, a scraper blade overlying said separating surface and anchored at its inner end to the trunnion and at its outer end to the frame, a discharge spout supported by the scraper blade in position to receive materials removed from the disk by the scraper blade, and means for feeding materials to be separated onto said separating surface in the vicinity of the inner end of the scraper blade.

6. The combination with a frame having a fixed upright trunnion, of a disk mounted on the trunnion and having a conical separating surface, two oppositely extended scraper blades overlying said separating surface and anchored at their inner ends to the trunnion and at their outer ends to opposite sides of the frame, and a discharge spout supported by each scraper blade in a position to receive materials removed from the disk by the respective scraper blade, and independent means for feeding materials to be separated onto said separating surface in the vicinity of the inner end of each scraper blade.

In testimony whereof I affix my signature in presence of two witnesses.

CARL J. ULRICH.

Witnesses:
JAMES THOMAS,
A. N. OLSON.

Copies of this patent may be obtained for five cents each, by addressing the "Commissioner of Patents Washington, D. C."